US009864122B2

(12) United States Patent
Ilmonen et al.

(10) Patent No.: US 9,864,122 B2
(45) Date of Patent: Jan. 9, 2018

(54) DIFFUSING OF DIRECT BACKLIGHT FOR A DISPLAY PANEL

(71) Applicant: MULTITOUCH OY, Helsinki (FI)

(72) Inventors: Tommi Ilmonen, Espoo (FI); Heikki Hyvärinen, Kuopio (FI)

(73) Assignee: Multitaction Oy, Helsinki (FI)

( * ) Notice: Subject to any disclaimer, the term of this patent is extended or adjusted under 35 U.S.C. 154(b) by 81 days.

(21) Appl. No.: 14/651,452

(22) PCT Filed: Jan. 11, 2013

(86) PCT No.: PCT/FI2013/050029
§ 371 (c)(1),
(2) Date: Jun. 11, 2015

(87) PCT Pub. No.: WO2014/108595
PCT Pub. Date: Jul. 17, 2014

(65) Prior Publication Data
US 2015/0316702 A1 Nov. 5, 2015

(51) Int. Cl.
F21V 7/04 (2006.01)
F21V 8/00 (2006.01)
(Continued)

(52) U.S. Cl.
CPC ......... *G02B 6/0016* (2013.01); *G02B 6/0036* (2013.01); *G02B 6/0051* (2013.01); *G02B 6/0053* (2013.01); *G02B 6/0055* (2013.01); *G02B 6/0068* (2013.01); *G02F 1/133524* (2013.01); *G02F 1/133603* (2013.01);
(Continued)

(58) Field of Classification Search
CPC .. G02B 6/0016; G02B 6/0036; G02B 6/0051; G02B 6/0053; G02B 6/0055; G02B 6/0068; G02F 1/133524; G02F 1/133603; G02F 1/133604; G02F 1/133605;
(Continued)

(56) References Cited

U.S. PATENT DOCUMENTS

2004/0016936 A1* 1/2004 Tanaka .................... H01L 33/20
257/98
2004/0100796 A1* 5/2004 Ward ................... G02B 6/0048
362/231
(Continued)

FOREIGN PATENT DOCUMENTS

JP 2007311070 A 11/2007
JP 2009175597 A 8/2009
(Continued)

OTHER PUBLICATIONS

English Translation of KR 2010-0138064 A (Dec. 31, 2010).*

*Primary Examiner* — Anh Mai
*Assistant Examiner* — Hana Featherly
(74) *Attorney, Agent, or Firm* — Shalom Wertsberger; Saltamar Innovations

(57) ABSTRACT

A rear illuminated light guide for an LCD screen with in-coupling gratings to receive backlight from an input surface and to spread received backlight laterally within the light guide. Out-coupling gratings receive laterally spread backlight and output at least some of the received laterally spread backlight through an output surface that is opposite to the input surface and towards the LCD screen. The input and output gratings have lateral offset.

21 Claims, 4 Drawing Sheets

(51) Int. Cl.
  *G02F 1/1335* (2006.01)
  *G06F 3/042* (2006.01)
(52) U.S. Cl.
  CPC .. *G02F 1/133605* (2013.01); *G02F 1/133606* (2013.01); *G02F 1/133611* (2013.01); *G06F 3/0421* (2013.01); *G02F 1/133604* (2013.01); *G02F 2001/133607* (2013.01)
(58) Field of Classification Search
  CPC ......... G02F 1/133606; G02F 1/133611; G02F 2001/133607; G06F 3/0421
  USPC ....................................................... 362/606
  See application file for complete search history.

(56) References Cited

U.S. PATENT DOCUMENTS

| | | |
|---|---|---|
| 2007/0086191 A1 | 4/2007 | Choi et al. |
| 2008/0123350 A1 | 5/2008 | Choe |
| 2008/0231772 A1 | 9/2008 | Hung |
| 2009/0086508 A1 | 4/2009 | Bierhuizen |
| 2009/0284956 A1 | 11/2009 | Gomi et al. |
| 2010/0165634 A1 | 7/2010 | Hong et al. |
| 2010/0238686 A1 | 9/2010 | Weber et al. |
| 2012/0013811 A1 | 1/2012 | Shimizu |
| 2012/0099304 A1 | 4/2012 | Kim et al. |

FOREIGN PATENT DOCUMENTS

| | | |
|---|---|---|
| JP | 2011039122 A | 2/2011 |
| KR | 20100138064 | 12/2010 |
| WO | WO2009/040722 | 4/2009 |

\* cited by examiner

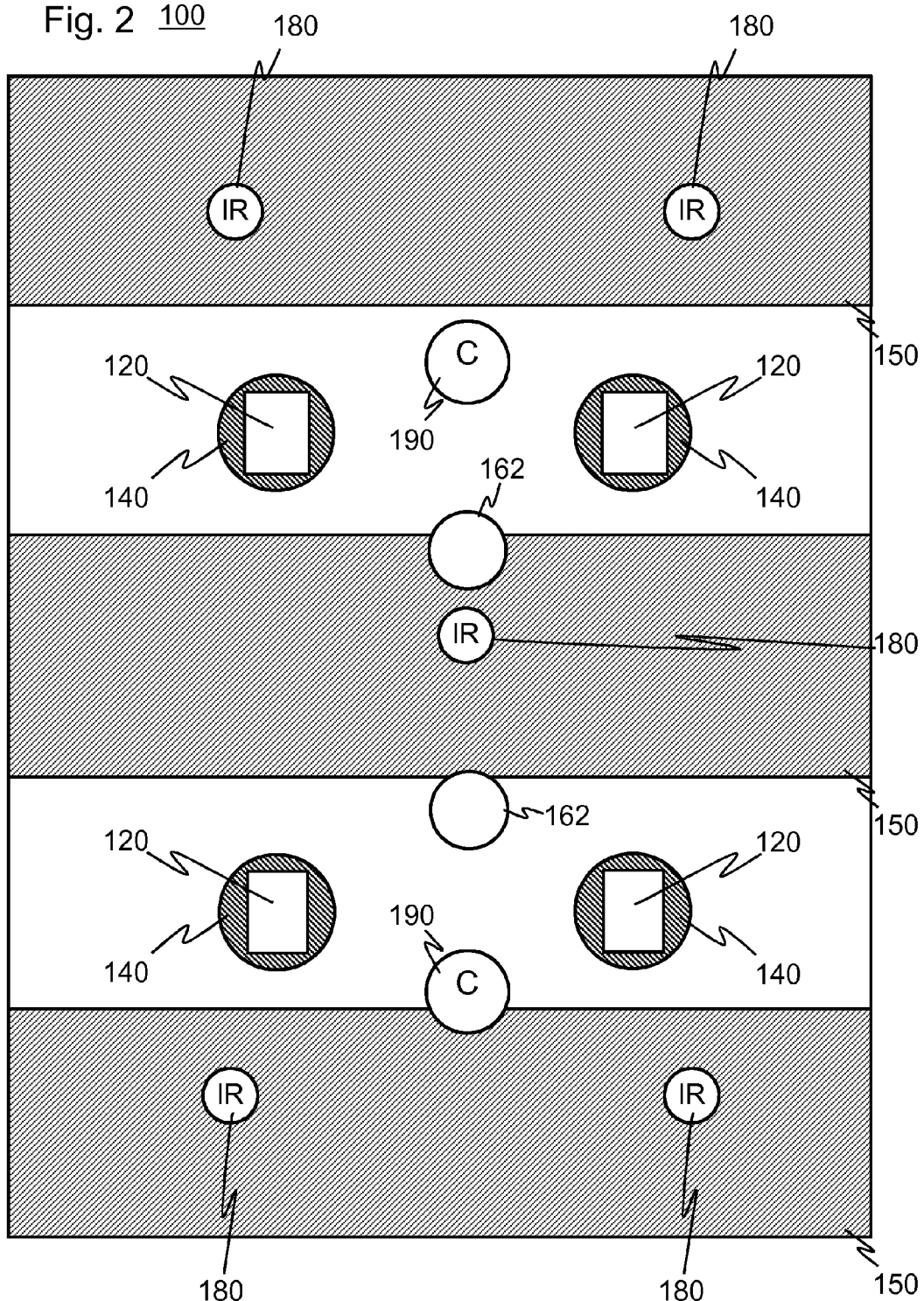

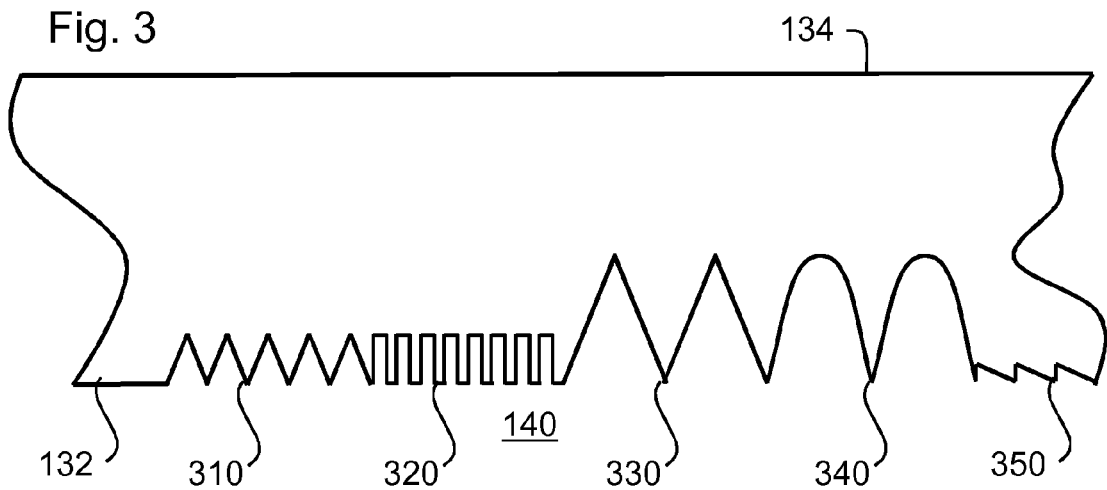
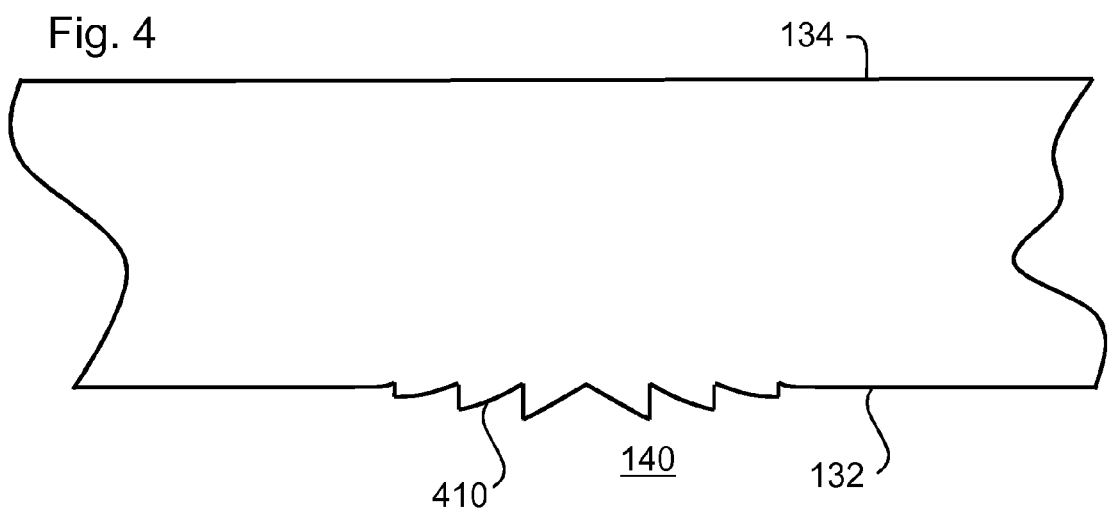
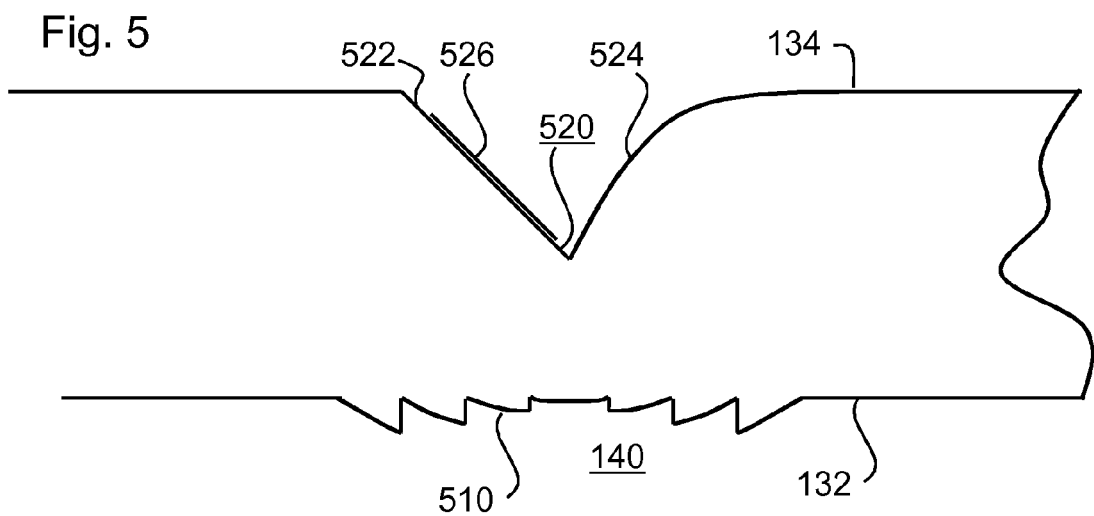

DIFFUSING OF DIRECT BACKLIGHT FOR A DISPLAY PANEL

TECHNICAL FIELD

The present invention generally relates to diffusing of direct backlight for a display panel. The invention relates particularly, though not exclusively, to a light spreading light guide and to diffusing of direct backlight of a display panel by a combination of the light spreading light guide and diffusion layer separated from each other by an air gap.

BACKGROUND ART

Some display panel techniques such as liquid crystal displays (LCD) require backlight. The backlight in large screens such as computer monitors and television sets is typically produced by arranging light sources such as light emitting diodes (LEDs) around a relatively thick planar light guide made of clear plastics. The light guide plate scatters through its surface light towards the LCD. The light is further diffused by an stack of light diffusing and prism foils. This technique is very common and can produce very even illumination of the LCD. However, a fair proportion of illuminating light radiated by the LEDs is lost in numerous reflections and refractions between the LEDs and the LCD. This results in increased illumination demand for the LEDs as well as heat dissipation, which may further contribute to accelerating aging of various components of the LCD device. The losses of illumination power also result in increased power consumption and in battery operated devices in reduced battery life in comparison to the ideal case in which all the light radiated by the LEDs could actually be used for backlighting.

SUMMARY

According to a first example aspect of the invention there is provided a light guide comprising:
  a planar light conducting body comprising two opposite surfaces that are an input surface for receiving backlight illumination and an output surface for emitting received backlight illumination;
  the planar light conducting body comprising for each of a plurality of backlight illumination sources:
    an in-coupling structure aligned with one of the backlight illumination sources and configured to receive backlight illumination through the input surface and to laterally spread most of the receiving backlight within the planar light conducting body;
    an out-coupling structure configured to direct most of the laterally spread backlight through the output surface for the emitting of the receiving backlight illumination;
  the in-coupling structure comprising at least one intruding or protruding form on at least one of the input surface and the output surface; and
  the out-coupling structure comprising at least one intruding or protruding form on at least one of the input surface and the output surface.

The in-coupling structure may comprise an in-coupling grating.

The in-coupling grating may have microscopic scale. The in-coupling grating may be diffractive grating. The diffractive grating may be concentric or radial with the backlight illumination source.

The in-coupling grating may comprise a plurality of forms the shape and/or amplitude of which depends on distance from the one of the backlight illumination sources with which the in-coupling structure is aligned, when the light guide is installed to receive light from the plurality of backlight illumination sources.

The in-coupling grating may be configured to form a diverging or negative Fresnel lens configured to laterally spread the received backlight illumination.

The in-coupling structure may comprise a form on the input surface configured to focus the received backlight illumination towards the output surface. The in-coupling structure may comprise an in-coupling grating configured to form a converging or positive Fresnel lens. The in-coupling structure may further comprise a spreading reflector formed on the output surface.

The spreading reflector may comprise a macroscopic form. The spreading reflector may be formed of a conical recess in the output surface. Alternatively or additionally, the spreading reflector may comprise a converging Fresnel lens.

The spreading reflector may comprise reflective material on the output surface.

The reflective material may be configured to form an opaque layer. Alternatively, the reflective material may be configured to form a translucent layer configured to pass through a minority of the received backlight illumination so as to mitigate forming of a dark spot at the spreading reflector.

The reflective material may comprise at least one of the following: silver; titanium dioxide; aluminum; and paper.

The spreading reflector may be a thin film stack reflector.

The out-coupling structure may comprise an out-coupling grating.

The out-coupling grating may comprise a plurality of forms the shape and/or amplitude of which depends on distance from the one of the backlight illumination sources with which the in-coupling structure is aligned, when the light guide is installed to receive light from the plurality of backlight illumination sources. Alternatively, the grating may have a constant profile and variable pitch or groove density.

The out-coupling grating may be configured to form a diverging Fresnel lens configured to laterally spread the received backlight illumination.

The in-coupling grating may be formed on either or both the output surface and the input surface.

The in-coupling grating may be formed on the input surface and the out-coupling structure may further comprise a spreading reflector formed on the input surface.

The spreading reflector may comprise reflective material on the output surface.

The out-coupling structure may further comprise a spreading refractor formed on the output surface.

The spreading refractor may be formed of a conical recess in the input surface.

The planar light conducting body may have an average thickness of 0.5 to 10 mm. The planar light conducting body may have an average thickness of 0.5 to 2 mm.

The planar light conducting body may be configured for the plurality of backlight illumination sources so that the backlight sources are arranged to a regular arrangement. The distance between adjacent backlight illumination sources may be 2 cm to 5 cm. The distance between adjacent backlight illumination sources may be at least 2.5 cm. The distance between adjacent backlight illumination sources may be at most 4 cm.

The light guide may be configured to provide transparent windows for infrared cameras for capturing infrared images through a display screen when the light guide is installed to provide backlight illumination for the display screen. The transparent windows may comprise regions with substantially even and smooth input and output surfaces in the field of view of the infrared cameras. Alternatively, the light guide may comprise apertures through which infrared cameras may be protrude or receive infrared light. Further alternatively, the light guide may comprise markers or mounting points for surface installation of infrared cameras onto the output surface. The light guide may comprise apertures for fixture members such as screws, studs or rivets for attaching the infrared cameras onto the output surface.

According to a second example aspect of the invention there is provided a backlight diffusion device comprising:
the light guide of the first example aspect;
a diffusion layer; and
a plurality of support pins configured to support the diffusion layer from behind when installed in a display screen, the support pins being transparent for mitigating formation of dark spots on the display screen.

The support pins may comprise abutting ends configured to face the diffusion layer. The support pins may be configured to receive and direct ambient backlight illumination from a space between the light guide and the diffusion layer towards the diffusion layer with an intensity corresponding to the intensity of backlight illumination incident on the diffusion layer next to the abutting ends.

The abutting ends may be cylindrical. Alternatively, the support pins may be continuously cylindrical or conical at least from half-way between the light guide and the diffusion layer up to the diffusion layer.

The light guide may be configured to form apertures allowing the support pins to pass through and be supported to a further structure behind the light guide.

The support pins may comprise in-coupling gratings.

According to a third example aspect of the invention there is provided a touch detection device comprising:
the light guide of the first example aspect or the backlight diffusion device of the second example aspect; and
the plurality of backlight illumination sources.

The backlight illumination sources may be white light emitting diodes.

The backlight illumination sources may be attached to the light guide. Alternatively, the touch detection device may comprise a support structure configured to fix together the backlight illumination sources and the light guide.

The touch detection device may further comprise the infrared cameras. The infrared cameras may be attached directly to the light guide. Alternatively, the infrared cameras may be attached indirectly to the light guide. The infrared cameras may be attached indirectly to the light guide through the support structure.

According to a fourth example aspect of the invention there is provided a touch screen device comprising:
the touch detection device of the third example aspect; and
a display screen.

The touch screen device may further comprise a case to which the display screen, diffusion layer and light guide are supported either directly or indirectly through intervening parts.

The touch screen device further comprises one or more infrared cameras configured to capture infrared images of at least portions of the display screen for optical touch detection.

The touch screen device may further comprise a processing unit configured to receive infrared images captured by the infrared cameras and to responsively perform optical touch detection of objects touching the display screen.

The touch screen device may further comprise one or more infrared light sources configured to illuminate with infrared light the display screen for assisting the optical touch detection.

The touch screen device may be selected from a group consisting of a television set; a computer display; an information screen.

According to a fifth aspect of the invention, there is provided a rear illuminated light guide for a liquid crystal display (LCD) screen comprising:
in-coupling gratings to receive backlight from an input surface and spread received backlight laterally within the light guide;
out-coupling gratings configured to receive laterally spread backlight and to output at least some of the received laterally spread backlight through an output surface that is opposite to the input surface and towards the LCD screen The input and output gratings may have a lateral offset. The input and output gratings may be spaced apart when seen from the direction of the LCD screen or in direction of a normal vector of the plane of the LCD screen.

Any of the gratings may be provided on either or both the input surface and the output surface.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which:

FIG. 2 shows a top view to the touch screen device of FIG. 1 as if seen without a diffusion layer of FIG. 1;

FIG. 3 shows a portion of a light guide body with different in-coupling grating structures;

FIG. 4 shows a portion of the light guide body with a negative or diverging Fresnel lens;

FIG. 5 shows yet another embodiment of an in-coupling structure;

DETAILED DESCRIPTION

In the following description, like reference signs denote like elements.

Figure 1:
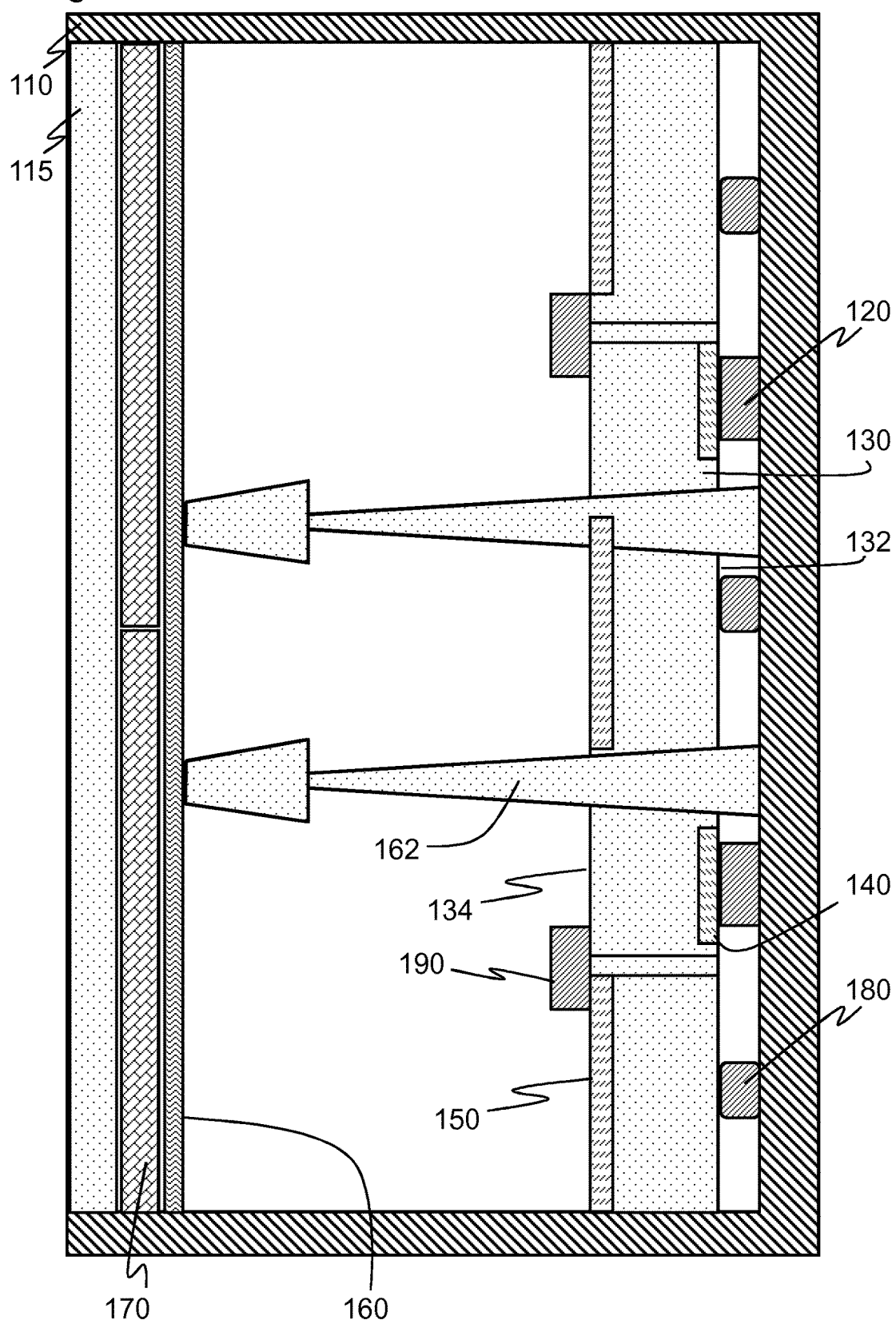
FIG. 1 shows a schematic picture of a touch screen device according to an embodiment of the invention.

FIG. 1 shows a schematic picture of a touch screen device 100 according to an embodiment of the invention. Following main parts are shown for explaining in the following some example aspects and embodiments of the invention:

a casing 110 with side and rear walls and a touching layer 115;

a plurality of backlight illumination sources 120;

a light guide body 130 having an input surface 132 towards the backlight illumination sources 120 and an opposite output surface 134, the light guide body 130 having a plurality of in-coupling structures 140 and out-coupling structures 150;

a diffusion layer 160;

a plurality of diffusion layer support pins 162;

a display screen 170;

a plurality of infrared light sources 180; and a plurality of infrared cameras 190.

It is emphasized that the in-coupling structures 140 and the out-coupling structures 150 can be provided on either or both of the input surface 132 and the output surface 134 even though FIG. 1 illustrates an embodiment with input structures 140 only on the input surface 132 and out-coupling structures 150 only on the output surface 134.

In sake of clarity, reference signs are drawn with reference lines for only one part with each different reference sign so as not to clutter the drawing with reference signs and lines. The pattern fills and shapes of the parts are chosen to help identifying of corresponding parts. It should be understood that FIG. 1 is not a cross-section. The different parts such as infrared light sources 180, infrared cameras 190 and support pins 162 need not be along a common plane as one might deduce if FIG. 1 were a cross-section, although these parts might be along a diagonal corner-to-corner cross-section.

The casing 110 is made, for example, of plastics, metal, glass, wood, carbon fiber and/or glass fiber materials. The touching layer 115 is of clear material such as clear or translucent glass; plastics such as acrylic such as acrylic resin; polycarbonate; epoxy; or any combination thereof.

The backlight illumination sources 120 comprises, for example, light emitting diodes (LEDs); organic LEDs (OLEDs); and/or incandescent lamps.

The light guide body 130 comprises, for example, clear or translucent glass; plastics such as acrylic such as acrylic resin; polycarbonate; epoxy; or any combination thereof. The light guide body has, for example, substantially uniform thickness except for microscopic variations.

If FIG. 1, the light guide body 130 is planar. The light guide body 130 is, for example, only 0.5 mm to 2 mm thick by average thickness.

The in-coupling structures 140 and the out-coupling structures 150 in FIG. 1 are made integrally with the light guide body 130. For example, the in-coupling structures 140 and/or the out-coupling structures 150 can be glued or melted to join with the light guide body 130. In another example, the light-guide body 130 is formed e.g. by molding so that the in-coupling structures 140 and/or the out-coupling structures 150 (and possibly various other deformations therein) are formed in the light guide body 130. In the embodiments in which the in-coupling structures 140 (and/or out-coupling structures 150) are attached to a surface of the light-guide body 130, the in-coupling structures can be made of different material than the light-guide body 130. However, the in-coupling structures 140 and the out-coupling structures 150 are typically made of optically clear or transparent material such as those non-exhaustively listed in the foregoing as possible materials of the light guide body 130.

The in-coupling structures 140 are aligned in FIG. 1 with respective backlight illumination sources 120. In FIG. 1, the in-coupling structures 140 form regions that are laterally concentric with the backlight illumination sources 120 so as to receive and redirect most of the backlight illumination from a respective source 120 to travel laterally within the light guide body 130. The in-coupling structures 140 can be made to cover a lateral area on the light guide body that is in comparison to illuminated input surface 132, for instance, 70% to 1000%, or typically 80% to 200%. In other words, the in-coupling structure can extend only little beyond the illuminated area (area through which more than 90% of the backlight illumination is received). By leaving a small portion of the illuminated input surface 132 not covered by the in-coupling structure 140, more backlight can be leaked out towards the display screen 170. This may avoid forming of dark spots at the in-coupling structures as might happen, if the in-coupling structures were too efficient and let insufficient amount of backlight leak through the in-coupling structure. On the other hand, if the in-coupling structure leaks too much backlight illumination, the output surface 134 or a portion of the output surface 134 at the in-coupling structure can be covered by reflective or absorptive material such as metal particles, metal foil, paper, light-colored plastics, ink, soot or adhesive tape. A reflective cover adds the advantage of increasing the efficiency of leading backlight from the sources 120 to the display screen 170, while an absorptive cover can be more economical particularly if only little shadowing is needed.

The in-coupling structures 140 typically comprise refractive parts, diffractive parts, reflective parts or any combination thereof. Also the out-coupling structures 150 typically comprise refractive parts, diffractive parts, reflective parts or any combination thereof.

The diffusion layer 160 can be a diffusion screen found in normal LCD televisions, for instance.

The display screen 170 can comprise one or more LCD screens. In an example embodiment, the display screen comprises a number of LCD screens arranged side by side. In one example, the edges of the LCD screens are slightly overlapping so as to reduce gaps between adjacent LCD screens.

The infrared light sources 180 are, for instance, infrared LEDs, infrared halogen lamps, or infrared incandescent lamps. In one embodiment, the infrared light sources and the backlight illumination sources are formed of common light sources that produce both white light and sufficient amount of infrared light for illumination of contacting objects for the infrared cameras 190.

The infrared cameras 190 can be miniaturized infrared cameras having a resolution of some tens of pixels to millions of pixels, depending on the number of cameras, the desired accuracy of touch detection and the size of the contacting objects to be detected. The cameras can be placed for example with 50 mm to 150 mm distance on a rectangular or hexagonal grid. The camera resolution can be for example 40×40 pixels to 200×200 pixels. The camera frame rate can be for example 60 to 300 frames per second. The cameras can be for example of type Aptina MT9V034C12STM. The infared cameras can be constructed e.g. by using black-and-white or colour CMOS or CCD cameras with an infrared-pass filter. The infrared pass filter may be implemented as a separate sheet, or it may be integrated to the camera lens, e.g. in the form of coating or manufacturing material.

FIG. 2 shows a top view to the touch screen device 100 as if seen without the diffusion layer 170 (so that details on the light guide body 130 are visible). If FIG. 2, the out-coupling structures 150 are drawn as rectangles as per one simple embodiment. While rectangular out-coupling structures 150 are very simple to form, annular regions surrounding are used in some embodiments e.g. coaxially around the in-coupling structures 140.

Around the area of the light guide, there are backlight sources 120 and (here coaxially arranged) in-coupling structures 140 and out-coupling structured configured to cause the light guide body to spread the backlight illumination relatively evenly towards the display screen (shown in FIG. 1). The infrared cameras 190 are located so that their fields of view collectively cover the entire display screen. In the embodiment of FIG. 2, the infrared light sources 180 are located at relatively even distances and so at the out-couplings so that their infrared light would be evenly spread around the display screen.

In FIG. 2, there are only two support pints 162. The support pins 162 are located so that they would not disturb the backlight illumination or the infrared cameras 190, while the spans between the support pins 162 are not excessive given the mechanical properties of the diffusion layer they support.

The support pins 162 can also be used to fix the light guide body in place. For example, the support pins 162 can be attached to the rear wall of the casing 110. The light guide body 130 can be provided with apertures through which the support pins pass, possibly snugly fitting or with lugs or other fixture members on the light guide body or the support pins that inhibit moving of the light guide body 130 along the support pins 162.

Various examples of in-coupling structures are presented in FIGS. 3 to 6.

FIG. 3 shows a portion of the light guide body 130 with different in-coupling grating structures. In FIG. 3, five different types of in-coupling gratings are shown adjacent to each other at the input surface 132 of the light guide body 130. In some embodiments, an in-coupling structure comprises two or more different in-coupling gratings while in some other embodiments, an in-coupling structure is formed of single type of in-coupling grating.

The in-coupling grating can be diffractive grating, see first portion 310, second portion 320, and fifth portion 350 in FIG. 3 wherein the grating has microscopic scale. Further on, the in-coupling grating can be a non-diffractive grating with macroscopic scale such as the third portion 330 or the fourth portion 340 wherein light refracts and/or reflects from surfaces of the grating. Also other forms of microscopic or macroscopic gratings can be used. Indeed, FIG. 4 shows a portion of the light guide body 130 with a negative or diverging Fresnel lens 410. When seen from the top of the light guide (in direction of FIG. 2), the Fresnel lens 410 can be annular, linear, oval, polygonal or of any arbitrary shape so as to spread light within the light guide body 130 to desired directions. Moreover, FIG. 5 shows yet another embodiment of an in-coupling structure 140 in which a positive or converging Fresnel lens 510 first collects backlight illumination together towards the output surface 134 of the light guide body. On the output surface 134, a spreading reflector 520 is provided e.g. by forming a suitable form that causes reflection laterally sideways. In FIG. 5, an asymmetric spreading reflector is drawn for exemplifying that the spreading reflector could be conical with linear wall 522 or with a curved wall 524. Of course, the spreading reflector can also be symmetric. Moreover, reflecting coating 526 can be provided asymmetrically on the output surface 134 as shown in FIG. 5 on the side of the linear wall 522 only. Also with this regard, the spreading reflector can be symmetric or asymmetric. The reflecting coating 526 can also be continuous or discontinuous e.g. with some holes or pinholes therein (not shown) so as to let a desired fraction of backlight to pass through the spreading reflector 520. The reflecting coating 526 can be done e.g. by painting or otherwise adhering reflective material on or within the output surface 134. The reflective material can be made to form an opaque layer. Alternatively, the reflective material can be made to form a translucent layer configured to pass through a fraction or minority of the received backlight illumination so as to mitigate forming of a dark spot at the spreading reflector.

The spreading reflector 520 is in one embodiment a thin film stack reflector.

The reflective material can be made of at least one of the following: silver; titanium dioxide; aluminum; and paper.

The in-coupling structures of FIGS. 3 and 4 can also be referred to as spreading refractors.

Figure 6:
FIG. 6 shows an in-coupling grating formed on an output surface of the light guide body.

FIG. 6 shows an in-coupling grating 610 that is formed on the output surface 134 of the light guide body 130. The output surface in-coupling grating 610 is so formed that it reflects light laterally within the light guide body. The output surface in-coupling grating 610 can be covered by reflective material similarly with the spreading reflector 520 so as to reduce passing of light through the light guide body 130 at the backlight illumination sources 120.

The out-coupling structure 150 can be made similarly with the in-coupling structure. The out-coupling structure 150 or some out-coupling structures 150 can be located on either or both of the input surface 132 and the output surface 134 of the light guide body 130. For example, any of FIG. 3, 4 or 6 could simply be flipped upside down and then the structure could be used as an out-coupling structure.

Figure 7:
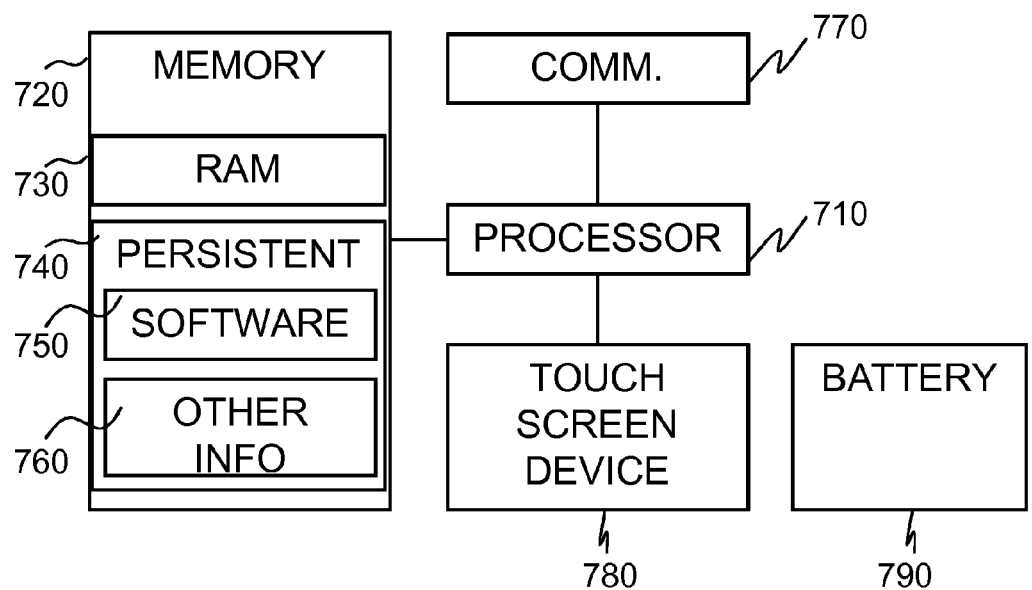
FIG. 7 shows a block diagram that illustrates some parts of the touch screen device from the point of view of signal processing.

FIG. 7 shows a block diagram that illustrates some parts of the touch screen device 100 from the point of view of signal processing. The touch screen device 100 comprises a memory 720 including a persistent memory 740 configured to store computer program code 750 and any other information 760 such as calibration parameters that should be stored over power off periods. The touch screen device 100 further comprises a processor 710 for controlling the operation of the touch screen device 100 using the computer program code 750, a work memory 730 for running the computer program code 750 by the processor 710, a communication unit 770 for communication with external devices and a touch screen device 780. The processor 710 is a master control unit (MCU), a microprocessor, a digital signal processor (DSP), an application specific integrated circuit (ASIC), a field programmable gate array, a microcontroller or a combination of such elements. A battery 790 can be provided for operation without mains current or during breaks in mains current.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention. For example, instead of the support pins 162, the diffusion layer can be supported against the light guide body 130 by a clear plastic bag filled with pressurized gas.

Additionally or alternatively, a net of clear or white plastic or metal strings can be provided to support the diffusion layer. In yet another example embodiment, the diffusion layer is configured supported by the display screen and/or that rigid that no further support is required.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A light guide for receiving and spreading light from a plurality of background illumination sources, comprising:
   a planar light conducting body comprising two opposite surfaces that are an input surface for receiving backlight illumination and an output surface for emitting received backlight illumination;
   the planar light conducting body comprising:
      a plurality of in-coupling structures, each aligned with one of the backlight illumination sources and configured to receive backlight illumination through the input surface and to laterally spread most of the received backlight within the planar light conducting body;
      an out-coupling structure configured to direct most of the laterally spread backlight through the output surface for the emitting of the received backlight illumination;
   the in-coupling structure comprising at least one intruding or protruding form on at least one of the input surface and the output surface, the in-coupling structure further comprises an in-coupling grating that comprises a form on the input surface; and
   the out-coupling structure comprising at least one intruding or protruding form on at least one of the input surface and the output surface;
   wherein the light guide is operational to receive and spread light from the background illumination sources, the form of the in-coupling grating focuses the received backlight illumination towards the output surface; and
   the in-coupling structure laterally spreads by reflecting with a spreading reflector the focused backlight within the planar light conducting body.

2. The light guide of claim 1, wherein in-coupling grating has microscopic scale.

3. The light guide of claim 1, wherein in-coupling grating comprises a plurality of forms in which at least one of the shape and amplitude depends on distance from the one of the backlight illumination sources with which the in-coupling structure is aligned, when the light guide is installed to receive light from the plurality of backlight illumination sources.

4. The light guide of claim 1, wherein the in-coupling grating is configured to form a converging or positive Fresnel lens.

5. The light guide claim 1, wherein the spreading reflector is formed on the output surface.

6. The light guide of claim 5, wherein the spreading reflector comprises a macroscopic form.

7. The light guide of claim 1, further comprising reflective material aligned with the in-coupling structure, on the output surface.

8. The light guide of claim 7, wherein the reflective material is configured to form an opaque layer.

9. The light guide of claim 7, wherein the reflective material is configured to form a translucent layer configured to pass through a minority of the received backlight illumination, the translucent layer being further configured to mitigate forming of a dark spot at the spreading reflector.

10. The light guide of claim 1, wherein the out-coupling structure comprises an out-coupling grating.

11. The light guide of claim 10, wherein the out-coupling grating comprises a plurality of forms in which at least one of the shape and amplitude depends on distance from the one of the backlight illumination sources with which the in-coupling structure is aligned, when the light guide is installed to receive light from the plurality of backlight illumination sources.

12. The light guide of claim 10, wherein the out-coupling grating is configured to form a diverging Fresnel lens configured to laterally spread the received backlight illumination.

13. The light guide of claim 1, wherein the out-coupling structure further comprises a spreading refractor formed on the output surface.

14. The light guide of claim 13, wherein the spreading refractor is formed of a conical recess in the input surface.

15. A touch detection device comprising:
   the light guide of claim 1; and
   the plurality of backlight illumination sources.

16. The touch detection device of claim 15, wherein the backlight illumination sources are white light emitting diodes.

17. The touch detection device of claim 15, wherein the backlight illumination sources are attached to the light guide.

18. The touch detection device of claim 15, further comprising a diffusion layer.

19. A touch screen device comprising:
   the touch detection device of claim 15; and
   a display screen.

20. The touch screen device of claim 19 further comprising a diffusion layer and a case to which the display screen, the diffusion layer and the light guide are supported either directly or indirectly through intervening parts.

21. The touch screen device of claim 20 selected from a group consisting of a television set; a computer display; and an information screen.

* * * * *